United States Patent [19]
Nonaka

[11] 3,843,152
[45] Oct. 22, 1974

[54] IMPACT ENERGY ABSORBING APPARATUS FOR VEHICLE

[75] Inventor: Masakatu Nonaka, Toyota, Japan

[73] Assignee: Toyota Jidosha Kogyo Kabushiki Kaisha, Toyota-shi, Aichi-ken, Japan

[22] Filed: Feb. 12, 1973

[21] Appl. No.: 331,599

[30] Foreign Application Priority Data
Feb. 29, 1972 Japan................................ 47-20831

[52] U.S. Cl. .......................................... 280/150 AB
[51] Int. Cl. ............................................. B60r 21/10
[58] Field of Search....... 280/150 AB; 417/151, 177

[56] References Cited
UNITED STATES PATENTS

| | | | |
|---|---|---|---|
| 3,525,536 | 8/1970 | Pruneski | 280/150 AB |
| 3,580,603 | 5/1971 | Chute | 280/150 AB |
| 3,600,003 | 8/1971 | Carey | 280/150 AB |
| 3,624,810 | 11/1971 | Hass | 280/150 AB |
| 3,632,133 | 1/1972 | Hass | 280/150 AB |
| 3,632,135 | 1/1972 | Chute | 280/150 AB |
| 3,674,284 | 7/1972 | Lohr | 280/150 AB |
| 3,680,884 | 8/1972 | Stephenson | 280/150 AB |

Primary Examiner—David Schonberg
Assistant Examiner—Terrance L. Siemens
Attorney, Agent, or Firm—Stevens, Davis, Miller & Mosher

[57] ABSTRACT

An impact energy absorbing apparatus including an energy absorbing bag confined within a steering wheel assembly of a vehicle and inflatable by pressurized fluid from an external pressure source when a collision occurs. The steering wheel assembly is provided at the base portion thereof with a cylindrical aperture coaxial with a steering shaft of the vehicle. The impact energy absorbing apparatus comprises a fluid discharger which includes a cylindrical discharging chamber in communication with the bag through the aperture and positioned inside the aperture with a predetermined space, whereby the bag is inflated by pressurized fluid from the pressure source through the discharger together with the air sucked along with the jet of the pressurized fluid from the space between the discharger and the aperture.

7 Claims, 5 Drawing Figures 3,843,152

IMPACT ENERGY ABSORBING APPARATUS FOR VEHICLE

BACKGROUND OF THE INVENTION

The present invention relates to a safety device for a vehicle to protect the driver from being injured when a collision occurs, and more particularly to an impact energy absorbing apparatus of a type including an energy absorbing bag confined within a steering wheel assembly of the vehicle and inflatable by pressurized fluid from an external pressure source when a collision occurs.

SUMMARY OF THE INVENTION

The prime object of the present invention is to provide an impact energy absorbing apparatus wherein an energy absorbing bag can instantly be inflated in an emergency by pressurized fluid from an external pressure source and the air sucked along with the jet of the pressurized fluid so as to increase the safety effect of the apparatus.

Another object of the present invention is to provide an impact energy absorbing apparatus, having the above mentioned characteristics, wherein no sealing means is required to be interposed between a fluid discharger of the apparatus and the energy absorbing bag, which creates no frictional contact between rotary and non-rotary parts respectively of the steering wheel assembly and the apparatus, so that the apparatus can have good durability and causes no inconvenience at all to the steering operation.

Still another object of the present invention is to provide an impact energy absorbing apparatus, having the above mentioned characteristics, wherein the secondary impact energy from the driver himself can well be absorbed by discharging the pressurized fluid from the inflated bag properly without adaptation of any additional or special device due to no provision of any sealing means.

A further object of the present invention is to provide an impact energy absorbing apparatus, having the above mentioned characteristics, wherein the apparatus can be easily and compactly installed within the steering system with the simple provision of communication means to connect the apparatus with the external pressure source.

BRIEF DESCRIPTION OF THE DRAWING

Additional objects and advantages of the present invention will be more readily apparent from the following detailed description of an embodiment thereof when taken together with the accompanying drawing in which.

DESCRIPTION OF THE PREFERRED EMBODIMENT

Figure 1:
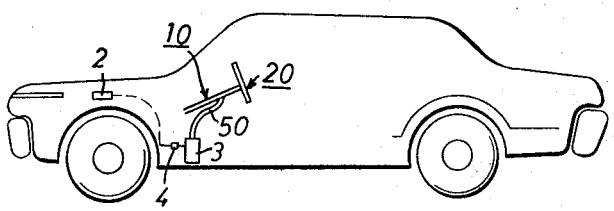
FIG. 1 is a diagrammatic side view showing a general arrangement of the present invention with other accessory devices.

Now referring to the drawing, in FIG. 1 there is diagrammatically shown a general arrangement of the present invention with accessory devices. A steering wheel assembly 20 is mounted on a steering column assembly 10 which is connected to a pneumatic pressure source 3 by way of a conduit 50. The pressure source 3 may be a conventional type such as a gas cylinder, which is operatively connected to a valve releasing device 4. The valve releasing device 4 is connected to a conventional collision sensing device 2 which is mounted on a portion of the vehicle body; the collision sensor 2 may be of a type to sense the deformation degree of the vehicle body in a collision or a radar sensor. The valve releasing device 4 functions to let pressurized operation fluid jet out from the pressure source 3 in response to a signal generated from the collision sensing device 2.

Figure 2:
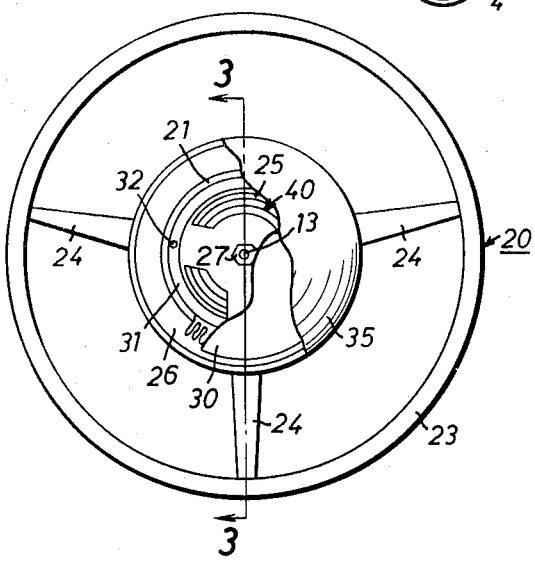
FIG. 2 depicts a plan view of an impact energy absorbing device in accordance with the present invention.
Figure 3:
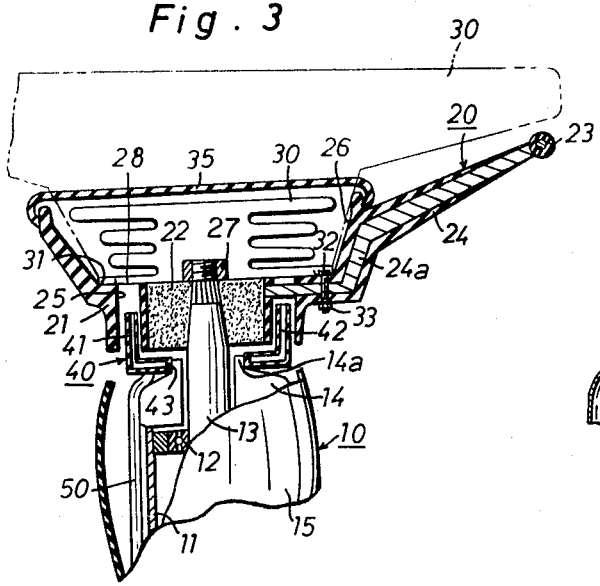
FIG. 3 is a vertical sectional side view taken along line 3—3 in FIG. 2.

As best illustrated in FIGS. 2 and 3, the steering column assembly 10 comprises a column tube 11 firmly secured on a portion of the vehicle body and a steering shaft 13 journalled rotatably within the column tube 11 by way of ball bearings 12. The steering column assembly 10 further includes an annular container 14 firmly installed on the upper end portion of the column tube 11, the annular container 14 being for containing various kinds of conventional switches to be installed within the steering column assembly 10, and a column cover 15 fixed on the column tube 11 to hold the component parts of the steering assembly therein. Clamped at the top end portion of the steering shaft 13 by a lock nut 27 is a boss member 22 integrally secured on the base portion 21 of the steering wheel assembly 20.

The steering wheel assembly 20 comprises three spokes 24 extending radially from the base end portion 21 and a wheel ring 23 for integrally connecting the outer ends of the spokes 24. The base portion 21 is provided therethrough with a cylindrical aperture 25 in the same axial direction as the steering shaft 13 of the steering column assembly 10. A room to contain an inflatable safety bag 30 therein is formed by way of the interior wall 26 of the steering wheel assembly 20 and the base end portion 21. Reinforcement members 24a of the spokes 24 are exposed within and crossing radially the cylindrical aperture 25.

The inflatable safety bag 30 is made of elastic material such as natural rubber, synthetic resin or the like, and is normally collapsed and contained within the room inside the steering wheel assembly 20; the annular inner rim of the safety bag 30 is hermetically secured on the upper face of the base portion 21 by way of a bolt 32 and a nut 33 through an annular retainer 31 which has a U-shaped cross section. The upper portion of the aperture 25 opens to the inside of the safety bag 30 and is closed by a breakable film 28 to prevent dust from getting into the safety bag 30. A cover 35 is detachably mounted on the steering wheel assembly 20 over the safety bag 30 and will be removed from the steering wheel assembly 20 when the safety bag 30 is inflated as shown with a broken line in FIG. 3.

Figure 4:
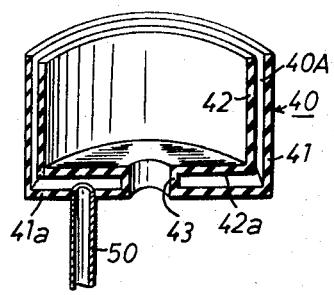
FIG. 4 is an enlarged vertical sectional side view of a gas discharger shown in FIG. 3.

Now reference is particularly made to FIGS. 3 and 4. A cylindrical gas discharger 40 is made of elastic material such as natural rubber, synthetic resin or the like, and includes a large diameter bottomed cylinder 41 and a small diameter bottomed cylinder 42, which are concentrically integrated at a center jointing portion 43 of the bottoms. Between the large and small cylinders 41 and 42, formed is a cylindrical discharging chamber 40A having an open upper end. The jointing portion 43 engages with an annular joint portion 14a provided at the top end of the container 14 which is a non-rotary portion of the steering column assembly 10.

When the steering wheel assembly 20 is assembled with the steering column assembly 10, the gas discharger 40 is assembled so that there may be a predetermined amount of space between the circumferences of the cylindrical aperture 25 and the perpendicular walls of the large and small diameter bottomed cylinders 41 and 42. Thus, the upper open end of the discharging chamber 40A of the gas discharger 40 is positioned beneath the reinforcement members 24a of the spokes 24. The conduit 50, one end of which is connected to the pressure source 3, is connected with the bottom 41a of the large diameter bottomed cylinder 41 near the jointing portion 43 so as to complete communication between the discharging chamber 40A and the pressure source 3.

With the above-mentioned steering device, rotation of the steering wheel assembly 20 turns the steering shaft 13 and the inflatable safety bag 30, but there will be no contact at all between the gas discharger 40 and the steering wheel assembly 20 so as not to cause frictional resistance in any way.

When collision of the vehicle occurs, the collision sensor 2 generates a signal therefrom to activate the valve releasing device 4. Thus, the pressure source 3 exhausts pressurized fluid into the conduit 50 and the pressurized fluid jets into the gas discharger 40. The pressurized fluid dashes against the bottom portion 42a of the small diameter cylinder 42 of the gas discharger 40 and spreads. Then the fluid runs inside the discharging chamber 40A upward so as to jet out from the upper open end of the annular chamber 40A. The pressurized fluid is further spread by the reinforcement members 24a of the spokes 24 and dashes into the inflatable safety bag 30 after breaking the film 28.

Consequently, the inflatable safety bag 30, which is now collapsed, is instantly inflated by the pressurized fluid jetting therein from the upper open end of the gas discharger 40 and the air sucked along with the jet of the pressurized fluid through the spaces between the gas discharger 40 and the circumferences of the aperture 25. The inflation of the safety bag 30 removes the cover 35 from the steering wheel assembly 20 and the inflated safety bag 30 protects the driver of the vehicle. When any load from driver is given to the inflated safety bag 30, the fluid within the safety bag 30 leaks out from the spaces between the gas discharger 40 and the circumferences of the aperture 25 to gradually deflate the safety bag 30 so as to absorb the impact energy given to the driver.

Figure 5:
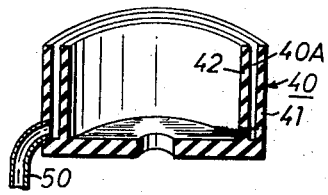
FIG. 5 shows a modification of the gas discharger shown in FIG. 4.

The gas discharger 40 may be formed in a way as shown in FIG. 5, wherein the large and small diameter bottomed cylinders 41 and 42 are integrated at the bottoms thereof and the cylindrical chamber 40A is formed between the perpendicular walls of the cylinders 41 and 42. The conduit 50 is connected at the side of the large diameter bottomed cylinder 41. The film 28 adhered on the base portion 21 of the steering wheel assembly 20 may only be adapted in necessity.

It should now be very clear that in the present invention as described hereinabove, the inflation of the inflatable safety bag 30 is effected by the jet of the pressurized fluid and the air sucked in together with the pressurized fluid to considerably reduce the operation time, which increases the safety effect of the device. Furthermore, with the present invention there is no necessity for the provision of any means to discharge the pressurized fluid from the inflated safety bag 30 to prevent an extraordinary pressure increase within the safety bag 30 caused by a secondary collision of the driver against the inflated safey bag 30.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An impact energy absorbing apparatus for a vehicle comprising:
   a collision sensing means for detecting a collision of the vehicle and generating a signal when a collision is sensed;
   an external pressure source located at a body portion of the vehicle for issuing pressurized fluid therefrom in response to the signal generated from said sensing means;
   a steering wheel assembly mounted on the top end of a steering shaft of the vehicle and provided at the base portion thereof with a cylindrical aperture coaxial with the axis of said steering shaft, said aperture opening upward to a container space formed above said base portion within said steering wheel assembly and downward to the bottom of said base portion;
   an inflatable bag confined within said container space to restrain movement of the operator of the vehicle during a collision;
   a fluid discharger including a cylindrical discharging chamber formed by a pair of bottomed cylindrical large and small diameter walls and mounted on the upper protion of a steering column tube surrounding said steering shaft and assembled within said aperture coaxial with the axis of said steering shaft, said discharging chamber being in open communication with the interior of said bag by way of spokes of said steering wheel assembly crossing said aperture, and a cylindrical air passageway being formed between the periphery of said fluid discharger and an inner wall of said aperture, said pressure source being located at the body portion of the vehicle externally of said steering wheel assembly and said steering column tube;
   communication means for connecting said external pressure source with said discharging chamber, whereby said bag is inflated by pressurized fluid from said pressure source through said discharging chamber together with atmospheric air being sucked along with the jet of said pressurized fluid through said air passageway.

2. An impact energy absorbing apparatus as claimed in claim 1, wherein said fluid discharger is mounted nonrotatably on a switch container secured at the top portion of said steering column tube.

3. An impact energy absorbing apparatus as claimed in claim 1, wherein said fluid discharger is made of synthetic resin.

4. An impact energy absorbing apparatus as claimed in claim 1, wherein a breakable film is hermetically secured on said base portion of said steering wheel assembly between said aperture and said bag.

5. An impact energy absorbing apparatus as claimed in claim 1, wherein said communication means is a conduit installed along said steering column tube for leading pressurized fluid from said pressure source to said fluid discharger.

6. An impact energy absorbing apparatus as claimed in claim 1, wherein said fluid discharger further comprises a radial chamber at the bottom thereof which is provided with a mounting portion concentric with said walls and mounted on said column tube, said mounting portion being connected with said pressure source at said radial chamber by way of said communication means so as to diffuse the pressurized fluid supplied from said pressure source at the upper wall of said radial chambers.

7. An impact energy absorbing apparatus as claimed in claim 1, wherein said walls of said fluid discharger are integrated at the bottom thereof where there is provided a mounting portion concentric with said walls and mounted on said column tube, said communication means being connected to an outer side wall of said fluid discharger so as to diffuse the pressurized fluid supplied into said discharging chamber at an inner side wall of said fluid discharger.

* * * * *